United States Patent
Ghiggino et al.

(10) Patent No.: US 7,583,432 B2
(45) Date of Patent: Sep. 1, 2009

(54) AMPLIFIED OPTICAL RING TRANSMISSION SYSTEM

(75) Inventors: Pierpaolo Ghiggino, Leamington Spa (GB); Francesco Poletti, Reggio Emilia (IT); Giovanni Razzetta, Sestri Levante (IT); Piergiorgio Sessarego, Genoa (IT)

(73) Assignee: Ericsson AB, Stockholm (SE)

( * ) Notice: Subject to any disclaimer, the term of this patent is extended or adjusted under 35 U.S.C. 154(b) by 295 days.

(21) Appl. No.: 10/542,296

(22) PCT Filed: Dec. 23, 2003

(86) PCT No.: PCT/IB03/06413

§ 371 (c)(1),
(2), (4) Date: Apr. 12, 2006

(87) PCT Pub. No.: WO2004/064280

PCT Pub. Date: Jul. 29, 2004

(65) Prior Publication Data

US 2006/0227412 A1    Oct. 12, 2006

(30) Foreign Application Priority Data

Jan. 15, 2003    (IT)    .............................. MI03A0050

(51) Int. Cl.
*H04B 10/17*    (2006.01)
*H04B 10/12*    (2006.01)

(52) U.S. Cl. ........................................ 359/337; 398/59
(58) Field of Classification Search ................. 359/337; 398/59

See application file for complete search history.

(56) References Cited

U.S. PATENT DOCUMENTS

| 5,088,095 | A | * | 2/1992 | Zirngibl | 372/6 |
| 6,115,154 | A | * | 9/2000 | Antoniades et al. | 398/4 |
| 6,175,436 | B1 | | 1/2001 | Jackel | |
| 6,388,802 | B1 | * | 5/2002 | Allan | 359/337 |
| 6,421,168 | B1 | | 7/2002 | Allan et al. | |
| 6,501,873 | B1 | * | 12/2002 | Moon et al. | 385/27 |
| 2002/0131098 | A1 | * | 9/2002 | Israel et al. | 359/110 |
| 2008/0131121 | A1 | * | 6/2008 | Magri et al. | 398/59 |

FOREIGN PATENT DOCUMENTS

WO        WO 02/33517 A2    9/2001

OTHER PUBLICATIONS

Xin et al, "The Benefits of closed cycle lasing in transparent WDM networks", Proceedings of the European Conference on Optical Communiciations Nice, France Sep. 1999.*
All-Optical Stabilization of Cascaded Multichannel Erbium-Doped Fiber Amplifiers With Changing Numbers of Channels, Conference on Optical Fiber Communications, J. L. Jackel, et al., Dallas, Feb. 16-21, 1997, pp. 84-85.
Xin, et al., "The Benefits of Closed Cycle Lasing in Transparent WDM Networks", Proc. ECOC 1999, Nice, France, Sep. 1999.

* cited by examiner

*Primary Examiner*—Eric Bolda
(74) *Attorney, Agent, or Firm*—Kirschstein, et al.

(57) ABSTRACT

A ringed optical transmission system comprises along the ring rare earth doped fiber amplifiers. The system has a gain peak with a $\lambda_{ASE}$ wavelength outside the $\lambda_1$-$\lambda_n$ band of the channels transmitted along the ring, the wavelength corresponding to an ASE emission peak of the amplifiers in the ring. In this manner a lasing peak forming a gain stabilization signal is produced.

13 Claims, 2 Drawing Sheets

AMPLIFIED OPTICAL RING TRANSMISSION SYSTEM

Figure 1:
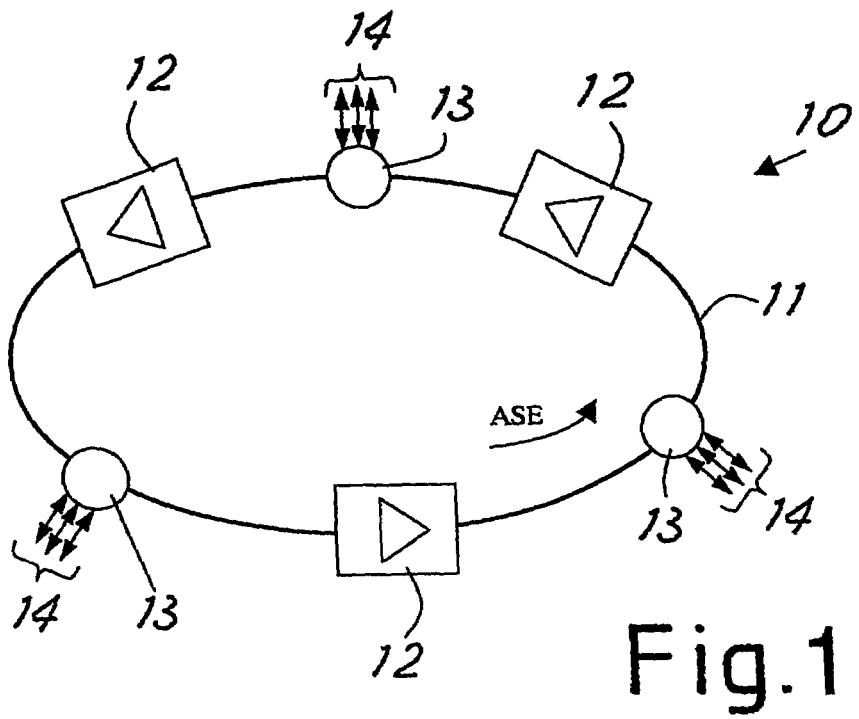

The present invention relates to an optical transmission ring where at least one optical amplifier is needed to compensate for losses in the fibers and in the passive components and in particular in a transmission system operating with Wavelength Division Multiplexing (WDM).

One of the main problems to be faced when designing amplified optical rings for use with WDM applications is recirculation of amplified spontaneous emissions (ASEs) produced by each amplifier, usually of the rare earth doped fiber type, for example, especially an Erbium-Doped Fiber Amplifier (EDFA).

WDM ring structures usually employ filters for adding or extracting specific channels from the optical line. In many cases to compensate for losses in the fibers or filters one or more optical amplifiers are necessary along the ring. The noise produced by these amplifiers outside the band allocated for the channels can recirculate in the ring if not controlled. If overall gain on the network ring is more than one, i.e. total gain is greater than total losses as may happen if some amplifier amplifies more than the attenuation of the preceding section, the ASE noise could be amplified as a signal and grow indiscriminately in the ring because of recirculation, making it difficult to control the ring status and ensure survival of the traffic channels.

At present there are two ways of attacking the problem. The first is to introduce an interruption along the ASE noise path at some point on the ring. In this manner the problem is solved with the disadvantage of having to introduce additional passive components and/or with the loss of flexibility in the system. Centralized traffic is necessary or any traffic reconfiguration requires the visit of the node which realizes the ASE interruption.

The second approach tends to force the network ring gain to keep it below the lasing threshold so that the ASE recirculation cannot increase in power while propagating along the ring. A problem with this approach is that EDFA or similar amplifiers have gain which depends on the power applied at input and in the power grid the power input to the amplifiers depends in turn on the number of channels active at that time. For this reason, in order to keep total gain beneath the lasing threshold under all possible conditions, including the addition or removal of channels and nodes, a complex global control algorithm of the ring with many monitoring points is needed or else it is necessary to hold the gain of the individual amplifiers low enough to ensure that even under conditions leading to the highest gain of the amplifiers the total gain in the network is less than 1. But this solution involves a considerable reduction in the overall performance achievable since when far from the highest gain conditions amplification of the individual amplifiers is much lower that that which could be realized.

To provide a gain control of an individual EDFA optical amplifier used in the telecommunications network it has been proposed in the prior art to use a local oscillator at the amplifier to produce an auxiliary compensation wave which is added to the useful signal. Such a system is described for example in U.S. Pat. No. 6.043.931. The auxiliary wave or control signal requires a specific generator and is produced in a specific amplifier on which correct operation of the system depends. The gain of an amplifier can be stabilized this way but it does not solve the above mentioned problems of a ring network because stabilization of gain remains local at the individual amplifier and therefore does not satisfy the above mentioned overall needs of a ring network.

The optical transport rings have great advantages in that at any access point or node a channel traversing the node does not necessitate being regenerated as would be necessary with a point-to-point system closed in a ring. Optical rings are thus the most suitable transport structures in metropolitan or regional areas where a mixture of centralized and network services is required. For these applications it is essential to provide the most economical and simplest solution for amplifying the signal without introducing excessive costs and disadvantages. The present invention provides a way of doing this.

The general purpose of the present invention is to remedy the above mentioned shortcomings by making available a control method and an WDM amplified optical ring system realized in accordance with the method which is capable of high performance, reliability, ease of realization and control and reduced costs.

In view of this purpose it was sought to provide in accordance with the present invention a gain control method in a ringed optical transmission system comprising along the ring rare earth doped fiber amplifiers and comprising positioning a gain peak at a wavelength ($\lambda_{ASE}$) outside the band ($\lambda_1$-$\lambda_n$) of the channels transmitted along the ring and corresponding to an ASE emission peak of the amplifiers in the ring and employing the lasing peak produced thus as a gain stabilization signal.

In accordance with the present invention it was also sought to realize a ringed optical transmission system comprising rare earth doped fiber amplifiers along the ring and characterized in that in them is a gain peak at a wavelength ($\lambda_{ASE}$) outside the band ($\lambda_1$-$\lambda_n$) of the channels along the ring and said wavelength corresponds to an ASE emission peak of the amplifiers in the ring so as to produce a lasing peak acting as a gain stabilization signal.

To clarify the explanation of the innovative principles of the present invention and its advantages compared with the prior art there is described below by way of example with reference to the accompanying drawings possible embodiments thereof.

Figure 2:
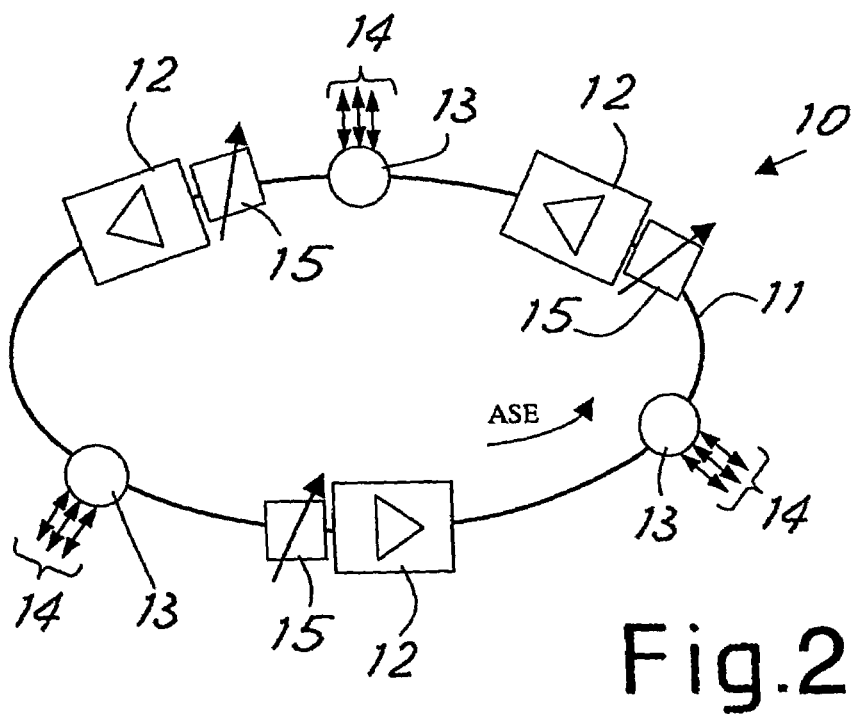
Figure 3:
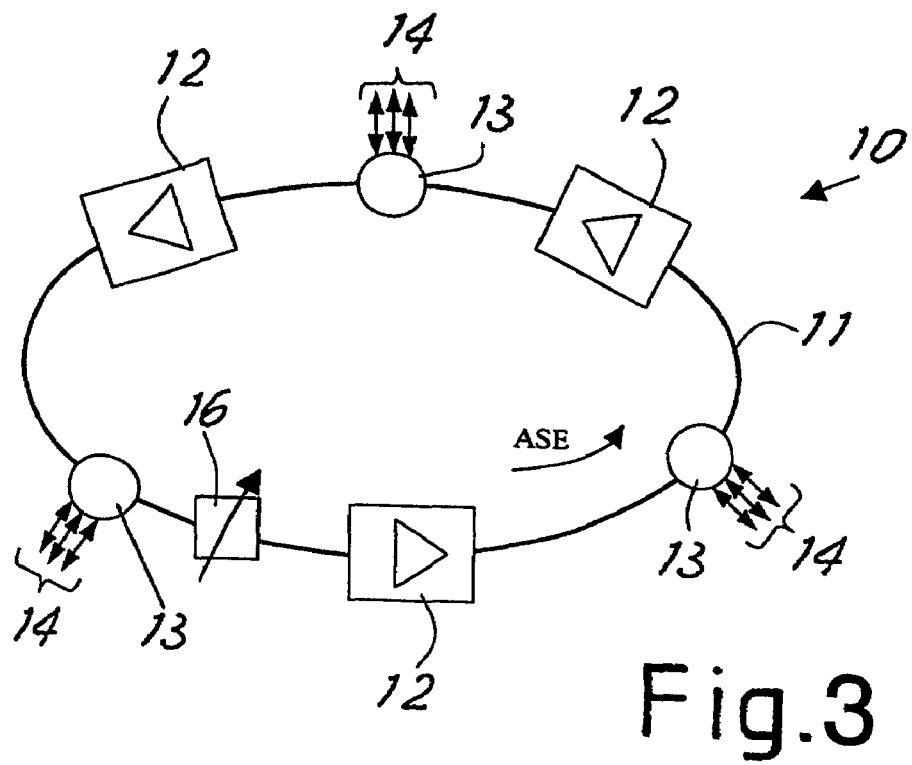
Figure 4:
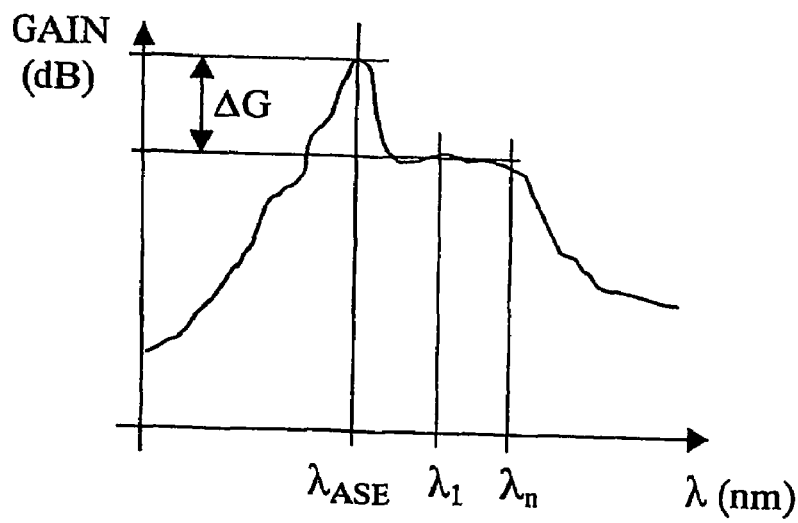

In the drawings:

FIG. 1 shows diagrammatically a ringed optical network applying the principles of the present invention, FIG. 2 shows a first variant in accordance with the present invention, FIG. 3 shows a second possible variant in accordance with the present invention, and FIG. 4 shows diagrammatically a chart of the behavior of the gain as a function of wavelength.

With reference to the figures, FIG. 1 shows diagrammatically a wavelength-division multiplexing (WDM) ring network designated as a whole by reference number 10 and applying the principles of the present invention. The ring comprises typically EDFA rare earth doped fiber amplifiers 12 connected in an optical fiber ring 11. The amplifiers are of a known type and not further discussed or shown as they are readily imaginable to those skilled in the art. At points in the network there are nodes 13 at which channels 14 are taken off or fed in. The number of channels taken off or fed in can vary from one node to the next and from one moment to the next in accordance with the specific needs of the network.

In addition to the channel signals, an ASE noise produced by the amplifiers also circulate in the network.

FIG. 4 shows diagrammatically the behavior of the gain spectrum of an EDFA or of an EDFA chain. The curve shown is merely explanatory and its exact behavior depends on many known factors which are not discussed here because they are not of interest in this specific case. Let it suffice to understand that the amplifiers employed are realized or, as clarified below, have devices such as input filters so that the gain spectrum will have a behavior as flat as desired in the $\lambda_1$-$\lambda_n$ band of the channels and relatively high peak at the $\lambda_{ASE}$ wavelength (outside the channel band) corresponding to an ASE emission peak. For an EDFA, this peak is around 1532 nm.

Considering the gain on the ring (which has the same general behavior), at peak the gain will be unity (1) to avoid uncontrolled increase of the ASE signal. The system reaches this value as a condition of balance. It was found that the difference in gain $\Delta G$ between peak gain and channel band gain should preferably be greater than or equal to 1 dB so that the peak will remain steady in the position selected far from the channels but not too far from 1 dB value so that the channels will have sufficient amplification. The preferred optimal value for $\Delta G$ was therefore found to be around 1 dB.

Recirculation of the ASE noise is subject to peak gain effects which produce a peak lasing at $\lambda_{ASE}$ (as stated, outside the band $\lambda_1$-$\lambda_n$ reserved for the channels). This peak lasing, usually considered harmful in known normal systems, can on the contrary be used as a signal for stabilizing the gain of all the amplifiers in the ring, hence achieving a ring with blocked gain with the stabilization signal which is not inside a particular individual amplifier but is common to all the amplifiers in the ring.

As known, EDFA amplifiers are preferably made to operate near saturation because under this condition the output power is virtually constant. As mentioned above, the problem in general is that variation in the number of channels changes the input powers while shifting the work point of the amplifier.

The present invention supplies an amplified WDM optical ring where stabilization of all the work points of the amplifiers following the addition or removal of channels and nodes is achieved by controlling the lasing effect on the ASE noise. In other words, all the amplifiers of the ring are controlled and stabilized by increase and control of the ASE noise lasing peak.

The idea of blocking the gain of an individual optical amplifier through a completely optical lasing signal produced by the amplifier have been amply discussed in the field and the conditions necessary for achieving this effect are not discussed further here in the details which are well known to those skilled in the art.

The present invention takes into consideration an entire ring network instead of an individual amplifier. The ring closing can be considered realization of both an amplification circuit and a feedback circuit. In other words, by making use of the gain peak effect created by a cascade of amplifiers closed in a ring, the optical feedback signal can be represented by the same ASE noise generated by the lasing effect and which circulates in the ring. Essentially, the entire network forms a controlled fiber ring laser.

As mentioned above, the lasing effect peak will be formed in a spectral position outside the band of the channels where the recirculation spectrum experiences the highest gain. It is thus possible to position the lasing effect noise peak at the desired wavelength $\lambda_{ASE}$ outside the band of the signals thanks to the design and/or control of the EDFAs according to what is now readily imaginable to those skilled in the art,. It is also possible to use specific known gain flattering filters (GFF) to create the required overall gain profile in such a manner as to force the lasing peak to a certain wavelength, for example, far enough from the traffic channels to avoid nonlinear interactions.

By choosing the ratio of power output of the EDFAs to total power of the useful signals it is even possible to control the lasing power peak and in the end achieve stabilization of all the gains of the EDFAs in the network. This power relationship was found advantageous where the ASE power peak was around 3 dB above the total power of all the useful channels.

Due to the stabilization peak achieved in accordance with the present invention channels can be added to and/or removed from any node in the ring without causing any significant change in the total power input to the amplifiers and therefore to the amplifier gains while achieving channel power survival thereby. When new channels are added the peak lasing power will diminish, while when channels are removed it will rise. In addition, in each node the addition or removal of one or more channels at a time has negligible effects on the remaining channels.

Numerous variants of the present invention can be realized. As shown diagrammatically in FIG. 2, a first variant comprises a variable optical attenuator 15 before each optical amplifier 12 for controlling its work point and hence its spectral gain profile when variations in the losses occur in the preceding section, for example, ageing of the transmission fibers, readjustments of the cables, additional junctions, etc. In this manner a very accurate control of the propagation spectrum around the ring is possible and can be maintained in the long term.

In a second variant, shown diagrammatically in FIG. 3, a single variable optical attenuator 16 is used in the entire ring allowing a less accurate control of the overall ring gain, not section by section but only once in the entire ring and still having excellent performance with less complexity and costs.

It is now clear that the predetermined purposes have been achieved by making available a method and a ring communication system in accordance with the method which allow having high performance without the problems such as those resulting from ASE recirculation. All this is without any complicated control algorithm or any dedicated communication channel between the nodes but with only the above mentioned control of the spectrum and a balancing of the EDFA outlet powers and channels.

Naturally the above description of an embodiment applying the innovative principles of the present invention is given by way of non-limiting example of the invention. This invention can be applied to optical amplifiers, even standard, doped with rare earths and with any possible pumping diagram. In addition, gain equalization filters can be used one per amplifier or one per ring to select the ASE lasing wavelength, hence by changing the gain characteristics of the ring in the signal band.

The invention claimed is:

1. A gain control method in an optical transmission system having rare earth doped amplifiers along a ring, the method comprising the steps of:
   a) positioning a gain peak at a wavelength outside a band of channels transmitted along the ring, the wavelength corresponding to an amplified spontaneous emission (ASE) emission peak of the amplifiers in the ring to produce a lasing peak; and
   b) employing the lasing peak as a gain stabilization signal.

2. The method in accordance with claim 1, in which the rare earth doped fiber amplifiers are erbium-doped fiber amplifiers, and in which the ASE emission peak at the wavelength is around 1532 nm.

3. The method in accordance with claim 1, in which the peak gain is more than a gain in the band of the channels by more than 1 dB.

4. The method in accordance with claim 1, in which the peak gain is more than a gain in the band of the channels by around 1 dB.

5. The method in accordance with claim 1, in which the peak gain is unity.

6. The method in accordance with claim 1, in which the ASE emission peak has a power held at around 3 dB above a total power of the channels.

7. An optical transmission system, comprising:
a) a ring;
b) a plurality of rare earth doped fiber amplifiers along the ring;
c) positioning apparatus for positioning a gain peak at a wavelength outside a band of channels transmitted along the ring, the wavelength corresponding to an amplified spontaneous emission (ASE) emission peak of the amplifiers in the ring so as to produce a lasing peak; and
d) stabilization apparatus for employing the lasing peak as a gain stabilization signal.

8. The system in accordance with claim 7, and at least one variable optical attenuator placed along the ring to allow change of overall ring gain.

9. The system in accordance with claim 7, and a variable optical attenuator connected at an output of each amplifier.

10. The system in accordance with claim 7, in that the rare earth doped fiber amplifiers are erbium-doped fiber amplifiers, and wherein the ASE emission peak at the wavelength is around 1532 nm.

11. The system in accordance with claim 7, in that the peak gain is more than a gain in the band of the channels by around 1 dB.

12. The system in accordance with claim 7, in that the peak gain is unity.

13. The system in accordance with claim 7, in that the ASE emission peak has a power held at around 3 dB above a total power of the channels.

* * * * *